Patented Mar. 1, 1949

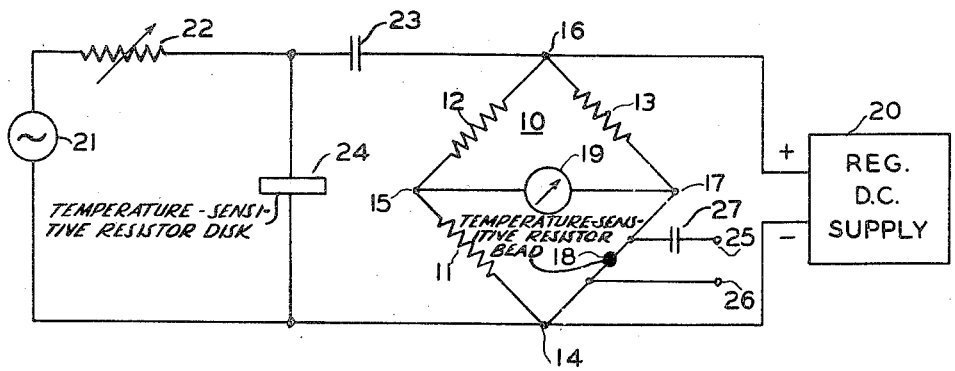

2,463,480

UNITED STATES PATENT OFFICE 2,463,480

COMPENSATED RADIO-FREQUENCY POWER MEASURING BRIDGE

Willard H. Fenn, Cambridge, and Rudolph N. Griesheimer, Belmont, Mass., and Jack W. Keuffel, Essex Fells, N. J., assignors, by mesne assignments, to the United States of America as represented by the Secretary of War Application August 1, 1945, Serial No. 608,300

17 Claims. (Cl. 171—95)

1

This invention relates generally to an electrical circuit and more particularly to a radio frequency (R.-F.) power measuring circuit.

In measuring radio frequency power one method employs a bridge network containing three fixed resistors and a temperature-sensitive resistor. The temperature-sensitive resistor may be of the type which includes nickel, manganese and cobalt. The electrical resistance of such a temperature-sensitive resistor increases approximately exponentially as the internal temperature of the resistive element of said resistor decreases.

A bead type element as just described may be used as a temperature-sensitive resistance, its resistance being controlled primarily by an electrical power input from the bridge power supply. The electrical power input may be a direct current or an alternating current. The internal temperature and resistance of the bead type temperature-sensitive resistor will also be a function of the ambient temperature and a function of the R.-F. power dissipated in the bead.

A disk type element as described above is intended for use as a temperature-sensitive resistance, its resistance being controlled primarily by the ambient temperature of the disk. The composition of the said disk is similar to that of the said bead. The principal difference between the two is the greater thermal mass of the disk. The current through the disk is not sufficient to appreciably alter the resistance of the disk and hence its resistance depends primarily upon the ambient temperature.

When zero R.-F. power is supplied to the bead, the bridge may be balanced for a definite ambient temperature by adjusting a D.-C. balancing voltage input to the bridge. When the proper D.-C. current flows through the bead to bring it to the correct temperature, and therefore the correct resistance, the bridge will balance. Such a balanced condition is indicated by zero current flowing through a microammeter in the output of the bridge circuit. When radio frequency power is now applied to the bead, the resistance of the bead will change, the bridge will become unbalanced, and the microammeter may be calibrated to indicate directly the value of radio frequency power.

If the ambient temperature changes, the internal temperature of the bead will change and the bridge must be rebalanced for zero R.-F. input. For example, when the temperature decreases, greater D.-C. potential must be applied to the bridge to allow more current to flow

2 through the bead and bring the resistance of the bead back to the correct value. The temperature coefficient of the resistance of the bead is many times that of the fixed resistors of the bridge circuit. Zero drift is the first type of error associated with an ambient temperature change in the bead type bridge.

In correcting the above error by increasing the applied D.-C. balancing voltage to the bridge, the sensitivity of the bridge changes, thus introducing a second type of error. This occurs primarily because any unbalance resulting from an applied R.-F. power will cause more current to flow through the microammeter because a greater D.-C. voltage than was used originally to balance the bridge is necessary for rebalancing. The calibrated microammeter will therefore indicate an amount of power greater than the true R.-F. power. Bridge sensitivity also depends upon the impedance of the D.-C. supply of the bridge. Usually the impedance of the D.-C. supply is varied so slightly that the sensitivity changes but little.

A third factor affecting the bridge sensitivity depends upon a variable coefficient K which is the ohms per watt characteristic of the temperature-sensitive resistor. The value of the coefficient K is a function of the resistance of the bead and is therefore dependent upon the temperature of the bead. By forcing the bead to operate on the same ambient characteristic, where its value of K is always the same at balance, sensitivity errors due to the shifting of the value of the coefficient K may be eliminated.

It is an object of this invention to provide automatic compensating means for correcting zero drift in a bead bridge network resulting from ambient temperature changes.

Another object is to prevent sensitivity shifting errors in the bead bridge network resulting from rebalancing the bridge due to ambient temperature changes.

A further object is to provide final manual means for trimming the bridge balance adjustment.

Other objects, features, and advantages of this invention will suggest themselves to those skilled in the art and will become apparent from the following description of the invention taken in connection with the accompanying drawing in which:

Fig. 1 is a circuit diagram embodying the principles of this invention.

Referring now more particularly to Fig. 1, there is shown a bridge network 10 consisting of three fixed resistors 11, 12, and 13 connected between terminals 14 and 15, 15 and 16, and 16 and 17, respectively, and a bead-type temperature-responsive resistor 18 connected between terminals 14 and 17. Radio frequency power to be measured is applied across terminals 25 and 26 and through coupling condenser 27 to bead 18. Galvanometer 19 connected between terminals 15 and 17 indicates the D.-C. bridge output. A regulated direct voltage supply 20 is connected to the bridge, its positive output being connected to terminal 16 and its negative output being connected to terminal 14 of bridge 10. An alternating voltage from auxiliary alternating voltage supply 21 is applied through a variable resistor 22 and a blocking condenser 23 to terminals 14 and 16 of the bridge. The frequency of the alternating voltage must be sufficiently high to prevent the temperature-sensitive resistors from following the alternating variations. For approximate temperature compensation of the alternating voltage supply, temperature-sensitive resistor disk 24 is shunted between terminal 14 of bridge 10 and an A.-C. potential common to variable resistor 22 and capacitor 23.

It can be shown by simple Kirchoff equations that the direct current, $I_a$, through the galvanometer 19 produced by a direct voltage E applied across terminals 14 and 16 of the bridge is $$I_a = \frac{E}{4R} \times \frac{KP}{R+R_a}$$

where R is the resistance of a fixed resistance 11, 12, or 13 (all assumed to be equal in this circuit), $R_a$ is the resistance of the galvanometer, P is the power in watts applied through terminals 25 and 26 to the bead 18, and K is the constant for said bead.

The direct voltage to the bridge from source 20 is always the same at balance but is not itself sufficient to produce complete balance. In order to get the maximum sensitivity from the bridge, the direct voltage applied to it is made just enough to balance the bridge at the highest ambient temperature at which the unit will be expected to operate.

An alternating voltage signal from source 21 is then superimposed upon the direct voltage in the bridge and the power dissipated in the bead 18 is adjusted by the amplitude of the alternating voltage to effect bridge balance. Since the bead 18 used in this apparatus has been chosen so the bead's resistance will not follow the alternating voltage variations, this alternating voltage is simply a source of heat for the bead. The lower the ambient temperature the greater is the alternating voltage that must be applied to the bridge. It is necessary to make the internal impedance of the alternating voltage supply (as viewed from the bead) closely equal to the resistance of the bead at bridge balance. This will make the alternating voltage power in the bead nearly independent of the unbalance of the bridge when R.-F. power is applied to the bead.

The D.-C. sensitivity of the bridge will not now be dependent upon the ambient temperature because the direct voltage applied to the bridge will be the same for all temperatures. Alternating voltage variations will not affect the galvanometer since the galvanometer will not respond to those frequencies.

Unless means are provided for forcing the bridge to operate on the same ambient characteristic where its value of K is always the same at balance the indication of R.-F. power on the meter will be in error. Adjusting the alternating voltage until the resistance of the bead 18 is correct for bridge balance will insure the above-mentioned condition. Then since the D.-C. bridge voltage E, the fixed resistance R, the meter resistance $R_a$, the constant K, and the ambient temperature do not change, the current $I_a$ through the galvanometer, as can be seen by the equation, will be directly proportional to the amount of R.-F. power applied to the bead.

It is evident that the alternating voltage from source 21 is divided, part of it appearing across the disk 24 and the remainder appearing across terminals 14 and 16 of the bridge. Without disk 24 the bridge would become unbalanced with slight changes in the ambient temperature. To make the adjustment of the auxiliary alternating voltage supply semiautomatic, disk 24 is effectively connected between terminals 14 and 16 and regulates the alternating voltage input to the bridge. For example, if the room temperature decreases, a larger alternating voltage is needed across terminals 14 and 16. The risistance of disk 24 rises and increases the applied alternating voltage balancing potential across the bridge. Approximate zero drift correction is achieved automatically with disk 24.

Low resistance bridge arms and a low resistance galvanometer coil are essential for good sensitivity. Sensitivity is improved by using a low resistance direct voltage supply. For measuring radio frequency power, particular attention must be paid to matching the impedance of the bead 18 to the R.-F. transmission line.

When the bridges are to be made in large quantities the resistors and disks are chosen so as to produce compensation for the average bead. The compensation will not be perfect for beads which differ from the average and for this reason there is provided the variable resistor 22 for a small final compensating adjustment.

The temperature compensated bridge described in this invention is useful in R.-F. power measurements. Power is indicated directly by the meter associated with the bridge. The principal advantage is that the sensitivity of the bridge does not change, and it offers approximate drift compensation.

This apparatus employing the above described bridge is particularly well adapted for use as a power monitor to give a continuous indication of power output.

While there has been described what is at present considered to be a preferred embodiment of this invention, it will be obvious to those skilled in the art that various changes and modifications may be made therein without departing from the scope of the invention.

What is claimed is:

1. A system for measuring radio frequency, including a Wheatstone bridge, three legs of said bridge each comprising a fixed impedance and the fourth leg of said bridge comprising a first temperature-sensitive resistance, said first resistance being primarily responsive to the power impressed upon it and less responsive to ambient temperature, means for substantially stabilizing the temperature of the fourth leg of said bridge, said stabilizing means including a source of alternating current connected across the input of said bridge and a second temperature-sensitive resistance connected in parallel with said input, said second resistance being primarily responsive to ambient temperature and less responsive to the power impressed upon it, means for coupling said radio frequency power across said fourth leg, and a meter connected across the output of said bridge for indicating the radio frequency power dissipated in said fourth leg.

2. A system for measuring radio frequency power, including a Wheatstone bridge having three legs of fixed impedance and a fourth leg comprising a first resistance having a negative coefficient of temperature and primarily sensitive to the power dissipated in said resistance and relatively nonsensitive to changes in ambient temperature, means for coupling said power across said fourth leg, a source of alternating current connected across said bridge, a second resistance having a negative coefficient of temperature and responsive primarily to ambient temperature and relatively nonresponsive to the current flowing through it, said second resistance being shunted across said source of alternating current, whereby said source of alternating current is capable of maintaining the parameters of said bridge substantially constant irrespective of variations in ambient temperature when said source of radio frequency power is disconnected from said fourth leg, a source of direct current also connected across said bridge, and a meter connected across said bridge for indicating the radio frequency power dissipated in said fourth leg.

3. A system for measuring radio frequency power as defined in claim 2, which also includes a variable resistor connected in series with said source of alternating current for adjusting the temperature of said bridge and a condenser connected between said bridge on one hand and said source of alternating current and said resistance on the other for blocking said direct current potential from said second resistance and from said source of alternating potential.

4. A system for measuring radio frequency power as defined in claim 2, in which said resistance in the fourth leg is a temperature-sensitive resistance having a high temperature coefficient relative to the temperature coefficients of the remaining members of said bridge.

5. A system for measuring radio frequency power as defined in claim 2, in which the impedance of the fourth leg of said bridge substantially matches the equivalent impedance of the balance of the circuit of said system.

6. A system for measuring radio frequency power as defined in claim 2, in which the direct voltage connected across said bridge has a value so as to balance said bridge at the highest ambient operating temperature of said bridge with the alternating source of potential disconnected from said bridge.

7. A system for measuring radio frequency power as defined in claim 2, in which the frequency of said alternating current source is sufficiently high so as to prevent the temperature of said fourth leg from following said frequency.

8. The combination defined in claim 11, wherein the said temperature-sensitive resistive element is primarily sensitive to the electrical current passing through it and relatively insensitive to ambient temperatures, and wherein the automatic regulating means includes a second temperature-sensitive resistive element which is connected across said alternating voltage and is primarily sensitive to ambient temperature and relatively insensitive to the electrical power impressed upon it.

9. The combination defined in claim 12, wherein the first temperature-sensitive resistive element is primarily responsive to the power impressed upon it, and wherein the second temperature-sensitive resistive element is primarily responsive to the ambient temperature.

10. In a bridge network as defined in claim 13, wherein the first element is primarily responsive to the electrical power impressed upon it and the second element is primarily responsive to the ambient temperature.

11. In combination, a temperature compensated bridge network including three substantially fixed resistors and a temperature-sensitive resistive element, said resistors and said resistive element being connected to form a closed circuit, said resistive element having a negative coefficient of temperature, an electrical power to be measured, means for applying said power to said resistive element, a direct voltage, means for applying said direct voltage to two opposite junctions of said bridge network, an alternating voltage, a variable resistance, means for applying said alternating voltage through said variable resistance to said same two opposite junctions, means for automatically regulating the amplitude of said alternating voltage in response to ambient temperature, and a direct current-sensitive meter connected across the other two opposite junctions of said bridge network for indicating the direct voltage output of said bridge, said voltage being a measure of said power.

12. In combination, a temperature compensated bridge network including three substantially fixed resistors and a first temperature-sensitive resistive element having a negative coefficient of temperature, an electrical power to be measured, means for applying said power to said first element, a direct voltage, means for applying said direct voltage to said bridge, an alternating voltage, a variable resistance, means for applying said alternating voltage through said variable resistance across said bridge, means for automatically regulating the amplitude of said alternating voltage in response to ambient temperature, said regulating means including a second temperature-sensitive resistive element also having a negative coefficient of temperature, and a meter associated with said bridge for indicating the direct voltage output of said bridge, said voltage being a measure of said power.

13. In a bridge network, a first temperature-sensitive resistive element, a direct input voltage applied to said network, an external electrical power applied to said first element, an alternating input voltage applied to said network, means for regulating said alternating voltage, said regulating means including a second temperature-sensitive resistive element, and means associated with said bridge for indicating the direct output voltage of said bridge.

14. In a bridge circuit for measuring radio frequency power, including three substantially fixed resistors and a first temperature-sensitive resistive element connected as the four sides of a Wheatstone bridge, the combination of an alternating voltage, a direct voltage, means for applying both said alternating voltage and said direct voltage to said Wheatstone bridge, and a second temperature-sensitive resistive element connected to said alternating voltage maintaining the parameters of said bridge substantially constant irrespective of variations in ambient temperature.

15. In combination, a temperature compensated bridge network including three resistors having relatively low coefficients of temperature and a resistive element having a relatively high coefficient of temperature, said resistors and said resistive element being connected to form a closed Wheatstone bridge circuit having two input junctions and two output junctions, an electrical power to be measured, means for applying said power to said resistive element, a direct voltage, an alternating voltage, means for applying said direct and alternating voltages to the input junctions of said bridge circuit, means for automatically regulating the amplitude of said alternating voltage in response to ambient temperature, and a meter connected across the output junctions of said bridge circuit for indicating the direct voltage output of said bridge, said voltage being a measure of said power.

16. In combination, a temperature compensated network including three resistors having relatively low coefficients of temperature and a first resistive element having a relatively high coefficient of temperature, an electrical power to be measured, means for applying said power to said first resistive element, a direct voltage, an alternating voltage, means for applying said direct and alternating voltages to said bridge network, means for automatically regulating the amplitude of said alternating voltage in response to ambient temperature, said regulating means including a second resistive element also having a high coefficient of temperature, and a meter for indicating the direct voltage output of said bridge, said voltage being a measure of said power.

17. A system for measuring radio frequency power, including a Wheatstone bridge having three legs of relatively fixed impedance and a fourth leg comprising a first resistance having a relatively high coefficient of temperature and primarily sensitive to the the power dissipated in said resistance and relatively nonsensitive to changes in ambient temperature, means for coupling said power across said fourth leg, a source of alternating current connected across said bridge, a second resistance having a relatively high coefficient of temperature and responsive primarily to ambient temperature and relatively nonresponsive to the current flowing through it, said second resistance being shunted across said source of alternating current, whereby said source of alternating current is capable of maintaining the parameters of said bridge substantially constant irrespective of variations in ambient temperature when said source of radio frequency power is disconnected from said fourth leg, a source of direct current also connected across said bridge, and a meter connected across said bridge for indicating the radio frequency power dissipated in said fourth leg.

WILLARD H. FENN.
RUDOLPH N. GRIESHEIMER.
JACK W. KEUFFEL.

REFERENCES CITED

The following references are of record in the file of this patent:

UNITED STATES PATENTS

| Number | Name | Date |
|---|---|---|
| 1,901,741 | Fetsch, Jr. | Mar. 14, 1933 |
| 2,367,868 | Jones | Jan. 23, 1945 |
| 2,399,481 | George | Apr. 30, 1946 |

FOREIGN PATENTS

| Number | Country | Date |
|---|---|---|
| 21,586 | Great Britain | 1908 |

OTHER REFERENCES

"Thermistors, Their Characteristics and Uses," by Pearson. Published in Bell Laboratories Record, Dec. 1940, pages 106–111.